(12) United States Patent
Gunyel et al.

(10) Patent No.: US 9,628,994 B1
(45) Date of Patent: Apr. 18, 2017

(54) STATISTICAL SYSTEM AND METHOD FOR CATCHING A MAN-IN-THE-MIDDLE ATTACK IN 3G NETWORKS

(71) Applicant: ARGELA YAZILIM VE BILISIM TEKNOLOJILERI SAN. VE TIC. A.S., Istanbul (TR)

(72) Inventors: Mahir Gunyel, Istanbul (TR); Ismail Bayraktar, Istanbul (TR); Onur Koyuncu, Istanbul (TR); Burak Gorkemli, Istanbul (TR)

(73) Assignee: Argela Yazilim ve Bilisim Teknolojileri San. ve Tic. A.S., Instanbul (TR)

( * ) Notice: Subject to any disclaimer, the term of this patent is extended or adjusted under 35 U.S.C. 154(b) by 0 days.

(21) Appl. No.: 14/984,911

(22) Filed: Dec. 30, 2015

(51) Int. Cl.
| | |
|---|---|
| H04M 1/66 | (2006.01) |
| H04W 12/12 | (2009.01) |
| H04W 24/08 | (2009.01) |
| H04W 64/00 | (2009.01) |
| H04W 68/12 | (2009.01) |
| H04W 88/08 | (2009.01) |

(52) U.S. Cl.
CPC ........... *H04W 12/12* (2013.01); *H04W 24/08* (2013.01); *H04W 64/00* (2013.01); *H04W 68/12* (2013.01); *H04W 88/08* (2013.01)

(58) Field of Classification Search
USPC .......................................... 455/410, 436–448
See application file for complete search history.

(56) References Cited

U.S. PATENT DOCUMENTS

2012/0030293 A1\* 2/2012 Bobotek ................ G06Q 10/10
709/206

\* cited by examiner

*Primary Examiner* — Joel Ajayi
(74) *Attorney, Agent, or Firm* — IP Authority, LLC; Ramraj Soundararajan (57) ABSTRACT

A novel method and system is introduced leveraging the data collected by a network probe to enhance cellular network capabilities to detect a man in the middle attack without using any software on the 3G mobile terminal. The new capabilities compile and process the data of call records collected from SS7 and location update messages in real time to determine the active 3G subscribers and to tag cells as 2G within a 3G coverage area to instantly identify an unknown cell generated by a fake base station. The system also has a component to notify authorities or to terminate the call once the fraud is identified.

16 Claims, 5 Drawing Sheets

STATISTICAL SYSTEM AND METHOD FOR CATCHING A MAN-IN-THE-MIDDLE ATTACK IN 3G NETWORKS

BACKGROUND OF THE INVENTION

Field of Invention

The disclosed invention generally relates to a system and method for detecting a malicious man-in-the-middle attack in a 3G cellular network, which is typically utilized to listen to a cellular phone call. The system of the invention is deployed within the mobile operator's 3G cellular core network along with a network probe, and can therefore detect many such attacks simultaneously. The system does not use any special application on user's mobile device.

Discussion of Related Art

A base-station-like apparatus can typically be used for man-in-the middle attacks in cellular networks to catch identities of mobile stations, to locate, listen and record communications. In 2G networks (such as the GSM networks), performing such an attack is unfortunately possible simply because the base stations (BS) may not be required to authenticate themselves towards cell phones to which they are providing service. While networks migrate from 2G to 3G (such as Universal Mobile Telecommunications System (aka UMTS), these two technologies will co-exist and interoperate. In order to facilitate a smooth transition to 3G, cellular networks allow subscribers to roam from 3G to 2G, and vice versa, depending on the availability of 3G in their vicinity. Doing so, subscribers can stay connected independent of technology availability.

In both 2G and 3G networks, authentications are carried out between the mobile station and the Mobile Switching Center (MSC). In 2G networks, encryption is carried out between the mobile station and the base station (BS), while in 3G networks encryption reaches a bit further into the backbone network up to the Radio Network Controller (RNC), which is located between the BS and the MSC. Note that on the network side, all BSs are connected to the MSCs. The 2G MSCs support only 2G authentication methods while 3G MSCs support both 2G and 3G authentication methods to support interoperability. Similarly, 2G base stations support 2G encryption methods, and the 3G base stations support the 3G encryption, which is defined by standards organizations. Only 2G base stations can connect to 2G MSCs. However, both 2G and 3G base stations can connect to 3G MSCs. Different mobile station BS and MSC combinations with 2G and 3G support lead to different types of authentication and encryption scenarios to ensure mobile stations stay connected while roaming across networks with different technology support.

2G networks are vulnerable to a man-in-the-middle attack because they allow an attacker to impersonate a fake base station towards a victim mobile station and as a mobile station towards a real BS at the same time. In order to conduct this attack, the attacker forces the victim mobile station to re-connect to the fake 2G base station by broadcasting the Cell Number (or cell ID) of the subscriber's home network. If the mobile station is in a stand-by mode, it will always connect to the base station from which it receives highest level of signal, and hence, the fake base station. Thus, the attacker can make the mobile station connect to itself bypassing any present real base stations. After connection set-up to the victim mobile station, the fake base station impersonates to be a mobile station towards the network by re-sending the identity information it obtained from the victim mobile station. In the subsequent authentication process, the attacker simply forwards the authentication traffic between the victim mobile station and the real network. By sending false information about its encryption capabilities to the network, the attacker (fake base station) can disable the encryption between itself and the network. By simply requesting to turn off encryption the attacker can also disable the encryption between the mobile station and the fake base station. This attack not only allows the attacker to eavesdrop on the communications between the mobile station and the network but also to insert and modify traffic. We call the fake base station an International Mobile Subscriber Identity-catcher, or simply 'IMSI-catcher', in the rest of the document.

Embodiments of the present invention are an improvement over prior art systems and methods.

SUMMARY OF THE INVENTION

In one embodiment, the present invention provides a method to detect a fake base station in a 3G cellular network, the 3G cellular network primarily providing 3G coverage and also providing 2G coverage when the 3G coverage is unavailable, the method comprising the steps of: maintaining a database comprising data collected in real-time (e.g., call signaling data or location update data) from the 3G cellular network, said database storing a 3G subscribers list and a 2G cells white list; detecting a 3G subscriber in the 3G subscribers list in the database that is forced to make a 2G call in a 2G cell that is not in the 2G cells white list in the database; and outputting a warning identifying the 3G subscriber as a victim of man-in-the-middle attack. 2G call volumes in a cell that are made by 3G users is used to determine if this specific 2G cell is in a place that there isn't any 3G coverage, with those 2G cells being placed in the 2G cells white list. In an extended embodiment, the method further comprises: maintaining for a 2G cell c: (a) a first counter L of 2G calls made by 3G users in the 3G subscribers list in cell c over a pre-determined period of time, and (b) a second counter Lt of all 2G calls made over the pre-determined period of time to include multiple calls made by the same user; comparing a function of L and Lt (e.g., L/Lt) against a pre-determined threshold (e.g., 1) and determining if cell c is a 2G cell that is in an area where there is no 3G coverage, and if so, placing cell c into the 2G cells white list.

In another embodiment, the present invention discloses a system to detect a fake base station in a 3G cellular network, the 3G cellular network primarily providing 3G coverage and also providing 2G coverage when the 3G coverage is unavailable, the system comprising: a database storing signaling data or location update data collected in real-time from the 3G cellular network, said database storing a 3G subscribers list and a 2G cells white list; and an analyzer call analyzing stored data and detecting a 3G subscriber in the 3G subscribers list in the database that is forced to make a 2G call in a 2G cell that is not in the 2G cells white list in the database; and outputting a notification (e.g., a SNMP trap, a web services notification or an SMS) identifying the 3G subscriber as a victim of man-in-the-middle attack. 3G and 2G call volumes in a specific cell within the 3G cellular network may be used to determine if the specific cell is a 2G cell providing the 2G coverage or a 3G cell providing the 3G coverage, with the determined 2G cells being placed in the 2G cells white list. In an extended embodiment, the method further comprises: maintaining for a cell c: (a) a first counter L of 2G calls made by 3G users in the 3G subscribers list in cell c over a pre-determined period of time, and (b) a second counter Lt of all 2G calls made over the pre-determined period of time to include multiple calls made by the same user; comparing a function of L and Lt (e.g., L/Lt) against a pre-determined threshold (e.g., 1) and determining if cell c is a 2G cell that is in an area where there is no 3G coverage, and if so, placing cell c into the 2G cells white list. In another extended embodiment, the system further comprises a detector to determine if the attack is performed towards a user that is in a critical user list.

In yet another embodiment, the present invention provides an article of manufacture having computer readable storage medium having instructions executable by a processor to implement a method to detect a fake base station in a 3G cellular network, the 3G cellular network primarily providing 3G coverage and also providing 2G coverage when the 3G coverage is unavailable, the method implemented by a processor comprising: maintaining a database comprising data collected in real-time from the 3G cellular network, said database storing a 3G subscribers list and a 2G cells white list; detecting a 3G subscriber in the 3G subscribers list in the database that is forced to make a 2G call in a 2G cell that is not in the 2G cells white list in the database; outputting a warning identifying the 3G subscriber as a victim of man-in-the-middle attack, and wherein 3G and 2G call volumes in a specific cell within the 3G cellular network is used to determine if the specific cell is a 2G cell providing the 2G coverage or a 3G cell providing the 3G coverage, with determined 2G cells being placed in the 2G cells white list as follows: maintaining for a cell c: (a) a first counter L of 2G calls made by 3G users in the 3G subscribers list in cell c over a pre-determined period of time, and (b) a second counter Lt of all 2G calls made over the pre-determined period of time to include multiple calls made by the same user; and comparing a function of L and Lt against a pre-determined threshold and determining if cell c is a 2G cell that is in an area where there is no 3G coverage, and if so, placing cell c into the 2G cells white list.

Embodiments of the present invention are significant improvements over prior art systems and methods as it can be deployed in the core of the cellular network and does not require any software or hardware changes in the mobile station. It can be deployed in the network as a stand-alone system, whose sole function is to discover fake base stations, or it can be integrated to other network functions such as a network probe or another type of network management system (NMS), which collects signaling data from the network. By catching one or more fake 2G base stations, the system can notify authorities about potential malicious attacks in the network and along with their targets and locations.

This invention eliminates the need for any changes in the mobile station, such as extra authentication and encryption steps in the SIM card or loading of any special software application on the mobile station. The key advantage of the apparatus is to increase the security of the overall network and discourage man-in-the-middle attacks.

The apparatus relies on passively monitoring the access network, and compiling and processing data records gathered from the 3G cellular network using A-interface and Iu-CS interface call and location update data records (XDRs). Furthermore, it does not require any modifications in the network components such as the Home Location Registrar (HLR), or Mobile Switching Centers (MSCs) or Base Stations (BSs). The detection performed by the system can be executed even when the mobile station is moving. This invention is a so-called 'centralized solution' since one instance of such a system can be deployed in the core network of a mobile operator to simultaneously detect attacks to many mobile stations.

The solution of this invention uses a probabilistic decision-making algorithm by collecting various key pieces of statistical information from the cellular phone call signaling and location update messages that can lead to a conclusion with a high probability that there is a malicious attack.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

Prior art includes solutions for stationary and moving mobile devices in 3G networks using only local software applications installed on the mobile terminals, or alternatively changes to the 2G authentication and encryption schemes. Such solutions can't provide a centralized detection of malicious attacks, and reporting to higher security authorities. Also, managing a local software application without a centralized system is not practical, as they require software upgrades, bug fixes etc. on each terminal that has the software.

A mobile station of a cellular network always tries to select a certain base station and camp within its coverage area. Traditionally, cell re-selection is based on the measurement of strength of the received radio signal, either at the base station or at the mobile station. For instance, in a 2G network, each base station transmits a signal on the so-called 'beacon frequency', which is different for neighboring base stations, on the so-called BCCH channel (Broadcast Control Channel). The mobile station calculates a C1 value using p1 and p2, as shown below. For instance, the C1 value commonly used in 2G is calculated from the equation below:

$$C1=(A-\text{Max}(B,0)), \text{ where}$$

A=average level of the received signal—p1 (dB)
B=p2—maximum transmission power of the mobile station (dB)
p1=allowed minimum value for the received signal
p2=allowed maximum transmission power for a mobile station.

The mobile station measures the reception levels of the broadcast signals coming from all neighboring base stations on the BCCH channel to calculate the C1 parameter corresponding to each neighboring base station. The base station (or so called cell) with the highest calculated C1 value is the most advantageous to connect regarding the strength of the radio connection (a more detailed description is presented for example in ETSI 05.08 version 6.4.0).

The International Mobile Subscriber Identity catcher (IMSI-catcher) tries to manipulate this cell reselection phenomenon. It uses a high transmission power in its BCCH transmissions compared to the transmission of the authentic cells' base stations. Additionally, it will most probably use a Location Area Code (LAC) in its transmission, which differs from the LAC codes of the authentic nearby 3G base stations of the cellular network (for example a LAC code differing substantially from the LAC codes in use). The actual base station of the cell sees the fake base station as a normal mobile station connecting to it as illustrated in FIG. 1B. Therefore, the authentic base station does not exclude the fake base station in its operation. Hence, the phrase 'man-in-the-middle attack'. Note that some implementations of IMSI-catcher listen to far-away BSs with weak transmission signals, and capture their properties such as frequency, Cell-ID and LAC to mimic that legal base station.

Figure 1A:
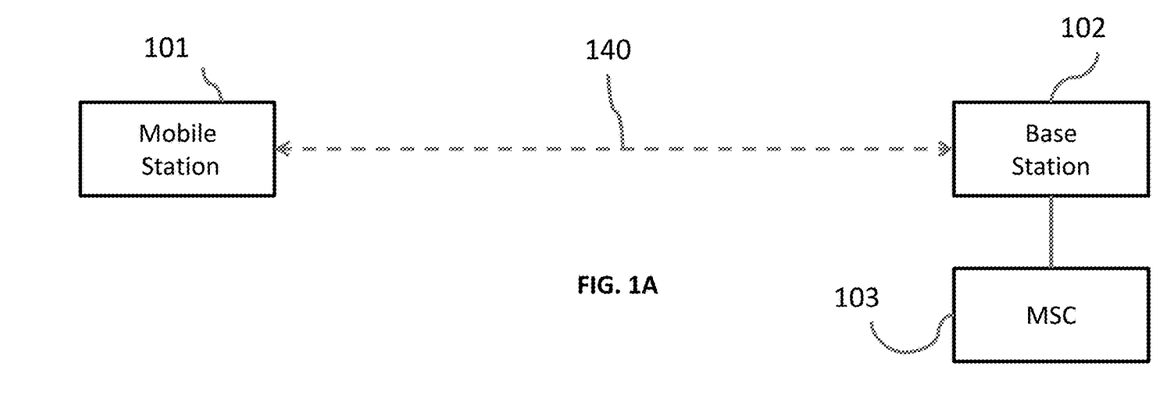
FIGS. 1A and 1B depict a prior art example of a man in the middle attach scenario.
Figure 1B:
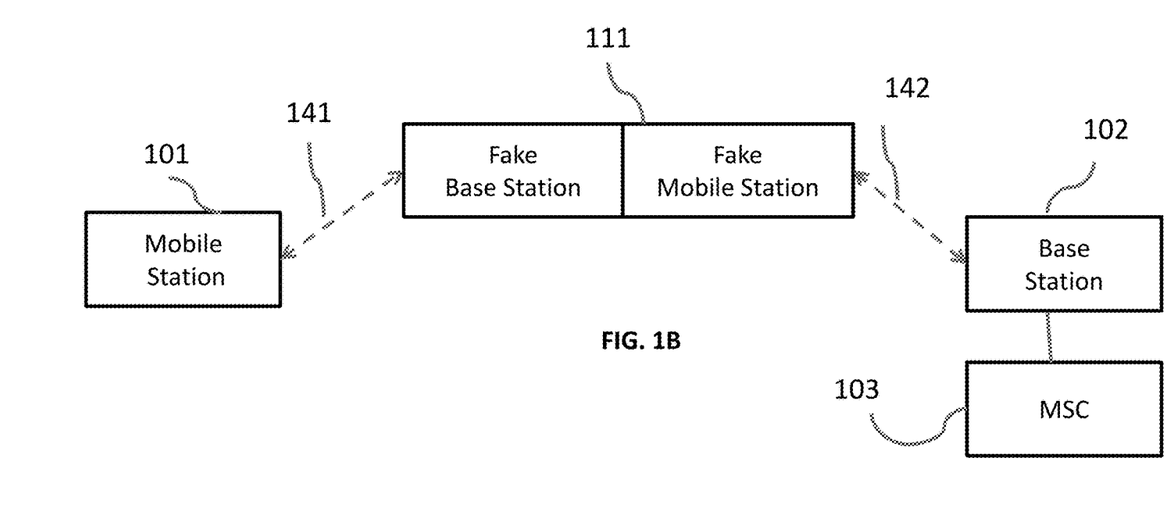

FIGS. 1A and 1B illustrate the scenario described above. In normal operations (FIG. 1A), 3G Mobile Station 101 connects to 3G Base Station 102 with radio link 140. In turn, 3G Base Station 102 connects to MSC 103. In FIG. 1B, IMSI-Catcher 111 takes the role of a fake 2G base station towards Mobile Station 101 and disables the encryption on link 141. Mobile Station 101 now acts as a 2G terminal since its base station of preference (fake base station 111) declares to support only 2G. At the same time, IMSI-Catcher 111 acts as a 2G mobile station towards Base Station 102 in FIG. 1B using 2G link 142. When Mobile Station 101 makes a phone call, IMSI-Catcher 111 reroutes the call to actual base station 102, which in turn routes the call in the mobile network to its destination. Therefore the mobile terminal does not discover that the fake base station is listening since the call reaches its destination. The goal with this invention is to catch such a fake base station particularly in a 3G network, alert the user of the victim mobile station or authorities, and record the cheating in a database. Although there are some solutions in the prior art, they all require some form of modification in the cellular phone.

Figure 2A:
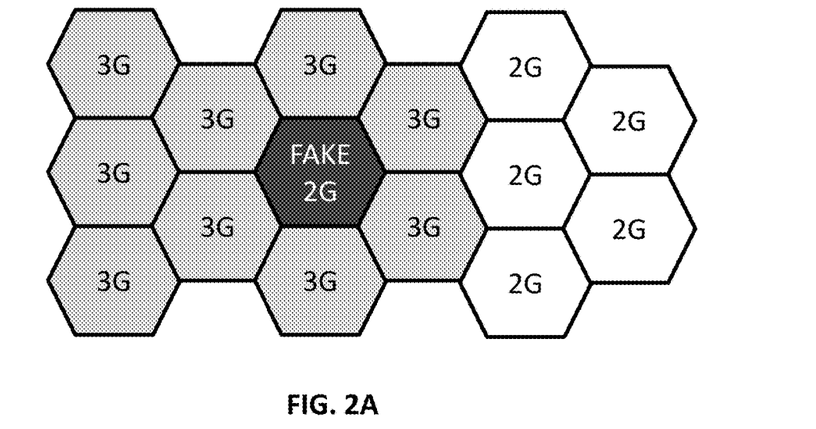
FIGS. 2A and 2B depict the cell structure of 2G/2G exemplary network with a fake 2G cell.
Figure 2B:
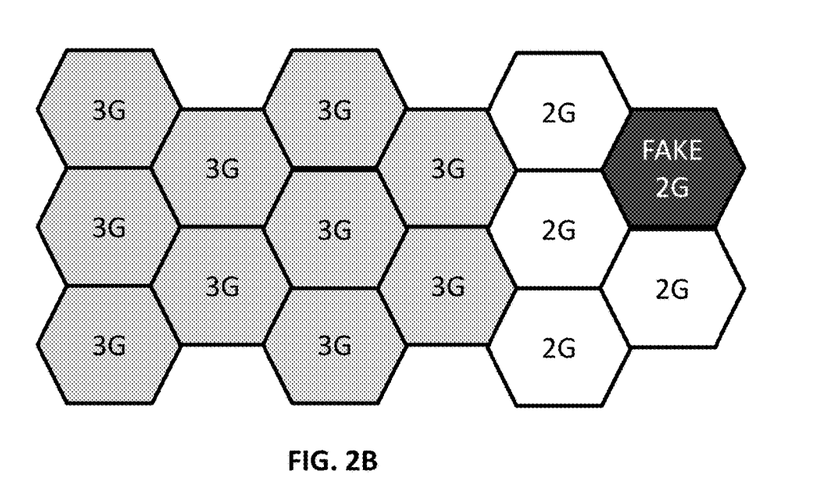

FIG. 2A illustrates a mixed 2G/3G network's cell structure, where there is a fake 2G BS inserted amongst the 3G cells where there is 3G coverage, as per FIG. 1B. A cell represents a specific coverage area served by a particular BS. A cell is identified by a Cell-ID, and a Location Area Code (LAC). It is plausible that the fake base station may insert itself into an area with primarily 2G cell coverage as illustrated in FIG. 2B. Note that during the evolution from 2G to 3G networks, some network areas may remain as 2G even within a 3G network. A key aspect of the invention is that those actual 2G cells of the operator's 3G network are identified from Key Performance Indicators (KPIs) measured using signaling messages, and listed in a database as a 'white list' so that the cell generated by the fake 2G base station is compared to this list, and if that base station is not listed, it is labeled as fake.

To summarize, an IMSI-catchers perform the following functions to accomplish a man-in-the-middle attack:
- Chooses a frequency in the specific geographic region unused by other 2G base stations (or possibly mimics a far-away base station);
- Chooses a frequency, a Cell-ID and a LAC previously unused in the specific geographic region by other base stations (or mimics a far-away base station);
- Most probably, uses unrecognized base station capabilities (note that each beacon signal of a base station must be accompanied by a list of supported features);
- Forces the victim mobile station to perform a new registration (so that the victim is forced to register to fake 2G base station);
- Forces the victim mobile station to downgrade from 3G to the less secure 2G network during registration;
- Disables encryption (set cipher mode to A5/0) to ease eavesdrop;
- Forwards victim mobile station's traffic. The attacker must forward the call, data and SMS to the public telephone system to eavesdrop and capture the information.

A software application implemented on the mobile station in the prior art may detect a fake base station from anomalies of actions of the network over BCCH transmissions, such as the aforementioned suspicious LAC code, surprisingly high transmission power, an unknown Cell-ID, different periodic location update frequencies, or possibly even anomalies in signaling messages like wrong network time, different cause code in location update termination, incorrect paging message, paging message with IMSI (International Mobile Subscriber Identity) or some combination of this list. An anomaly can also be a geographical location of the fake base station that is not included in a list of possible locations of the base stations belonging to the serving operator's cellular network. However, many smart IMSI-catcher implementations can easily mimic a farther away legal base station with weak radio transmission without creating any suspicion on the software application and therefore can most likely go unknown to user.

Although such a stand-alone local software application is viable, it is an impractical solution as the application must be deployed in all mobile stations that suspect such attacks. Furthermore, keeping the software current and functioning (uploading new releases, for example) on these mobile stations is operationally difficult. Even when the software application detects a suspicious base station and terminates the call, without a centralized system keeping a record of such attacks and reports to authorities to catch the malicious attacker, the value of such catching may not be substantial.

The objective of the present invention is to detect man-in-the-middle (MITM) attacks in the core of the 3G cellular network towards a 3G mobile station, by analyzing primarily signaling messages and using a special algorithm that relies on the statistical calling behavior of a collection of 3G mobile stations in a particular geographic area or a mobile operator's entire network. The invented 'IMSI catcher detection' algorithm can be executed on a network probe or as a stand-alone device.

A network probe typically collects signaling messages and converts them to useful and summarized data records that the system of invention can use, or alternatively the system can perform the probe function as well. Non-limiting examples of network probes that may be used to collect such data include SS7 probes that are typically used in a telecommunication network.

Figure 3:
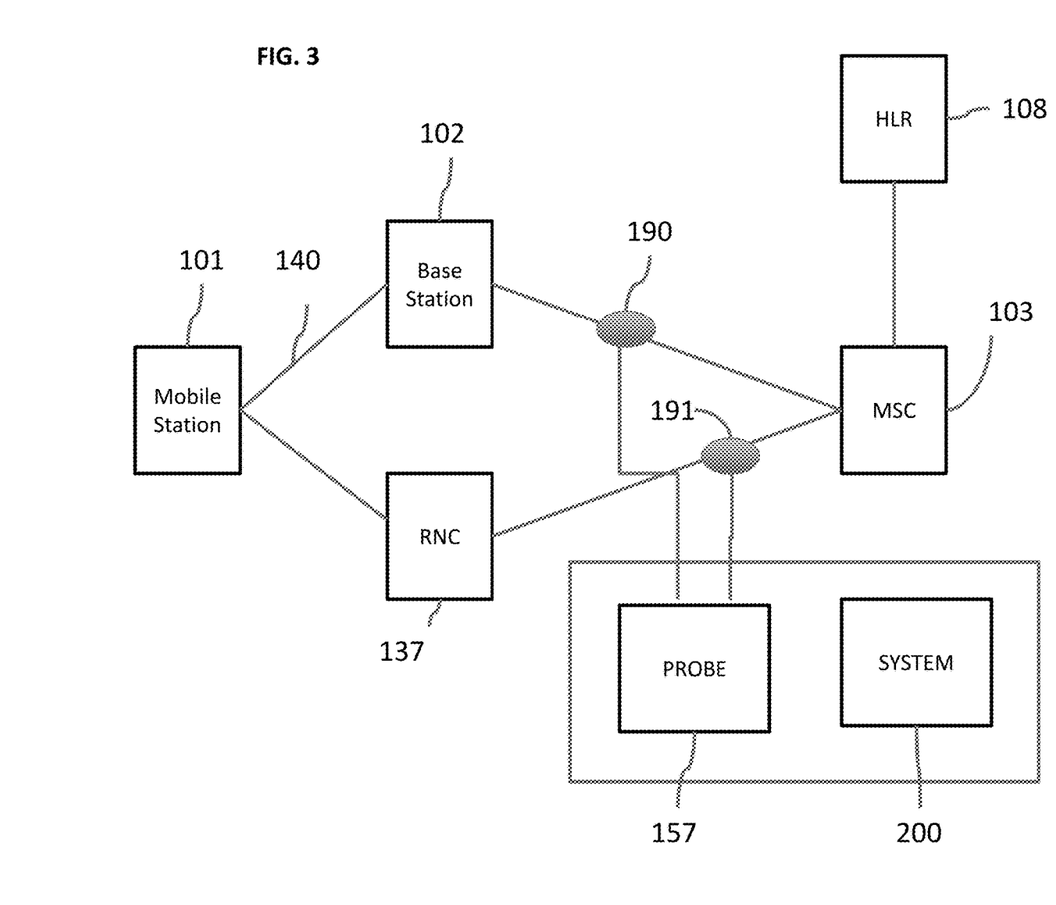
FIG. 3 depicts an example of a 3G cellular network where an IMSI-catcher is deployed.

FIG. 3 illustrates where the system of invention will be placed in a mobile operator's core network. Mobile Station 101 connects to 3G cellular network's access through base station 102 and Radio Network Controller (RNC) 137, which in turn connect to MSC 103 (which in turn connects to Public Telephony Network). Home Location Registrar (HLR) 108 connects to MSC 103 and keeps locations of mobile stations while they roam in the cellular network. The shown system 200 of this invention is collocated with Network Probe 157, which collects Key Performance Indicators (KPIs) from the A-interface 190 between BS 102 and MSC 103, and Iu-CS interface 191 between RNC 137 and MSC 103. These two interfaces are defined by standards, and carry signaling messages and mobility management messages. Note that the network probe monitors many such interfaces across the entire cellular access network. Typically, it passively monitors these messages, and captures KPIs in a database. The probe function may be a separate function from System 200, or in another possible embodiment, it may be a component of System 200, or yet in another embodiment, System 200 may be a function of the network probe without changing the fundamental concepts of this invention.

Although this invention is described for 3G networks, it may equally apply to 4G networks when the IMSI-catcher forces a 4G mobile station to downgrade to 2G.

One key foundation of the algorithm used in the embodiment of invention is to detect the volume of 3G to 2G switching in the core 3G cellular network. Note that legal switching from 3G to 2G can always be observed under many network conditions.

A 3G subscriber's mobile station will attempt to register as a 2G terminal,
(i) while roaming using standard Location Update (LU) procedures if the visited network cannot support 3G mobile stations, or
(ii) there is a problem in the radio access of the home or visited 3G network, or
(iii) there is insufficient radio capacity corresponding 3G site, or
(iv) user prefers to reset the terminal to 2G at a specific location because 2G reception is generally much better.

While these are perfectly legitimate scenarios that force switching from 3G to 2G, it also occurs when there is an IMSI-catcher, which aims to exploit 2G's vulnerability to execute a MITM attack as illustrated in FIG. 2. In order to force a 3G mobile station to switch from 3G to 2G, a fake base station will jam radio frequencies used by the mobile station and force it to trigger a new Location Update (LU) Procedure to execute a 2G registration. Normally, if the mobile station has a 3G subscriber profile in the HLR, and it receives a radio signal from the legitimate 3G base stations, which has proper received signal strength values, it is expected to remain to use the 3G service. The system of invention will execute a detection algorithm from early stage of signaling messages and generate alarms or notifications towards concerned systems or authorities (e.g. NMS via SNMP) when the anomaly is detected.

Figure 4:
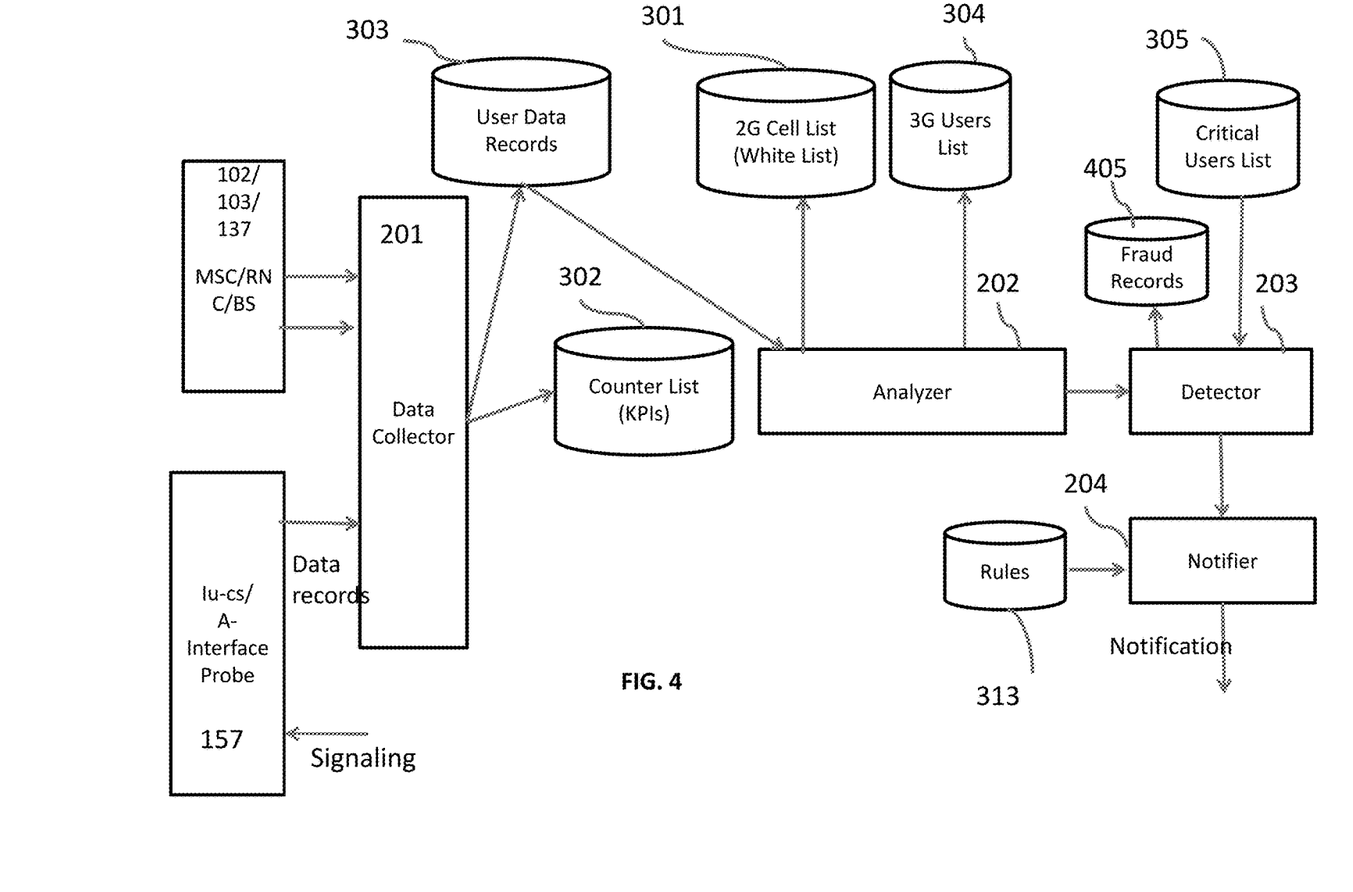
FIG. 4 depicts an exemplary high-level block diagram of the embodiment of the IMSI-catcher apparatus according to the invention.

System 200's block diagram is illustrated in FIG. 4. The algorithm calculates MITM attack possibility via specific decision rules. The algorithm relies on various pieces of real-time data collected via network probe 157. User Data Records in User Data Records Database 303 are created by the network probe. KPIs are stored in the same or a different database. These databases are managed by Data Collector 201. Additional databases are created by Analyzer 202, which further analyzes in real-time the call related data collected, by implementing counters:

Determining 3G User Base (3G Users List 304).

This is essentially a living list of all 3G users in the network. Note that users come and go, and therefore this list must be kept fresh by updating its content as new data is made available to the system. Before the operations of System 200, we assume that sufficient observation time has expired, which allowed the system to create a reliable list. This list can be kept up to date in various ways:
(1) By using HLR subscriber profiles, the system can determine if a subscriber is registered as 3G or not using the subscriber profiles.
(2) By using the 3G real-time calling behavior, it is possible to determine if the user is 3G or not. A 3G subscriber normally will initiate some volumes of its calls in 3G, but there will also be some small volume of 2G calls, which primarily occurs during going through areas that do not support 3G technologies, for example.
(3) By using Location Update (LU) procedures in 2G and 3G transitions, it is possible to determine if a user is 3G or 2G. Normally, a 3G subscriber will remain in 2G while roaming only when 3G is not supported in a specific cell on the transit route (and therefore a brief time period until the next 3G cell is reached). This behavior will be used in determining if the user is 3G or 2G. A 3G user will immediately attempt to go back to 3G as soon as it finds a 3G cell or when the 3G radio conditions in the current cell improve. Those users who stay in 2G for long periods of time are typically 2G subscribers who do not have 3G support on their mobile station. This fact is used to eliminate those users that are 2G users.

Determining a Base of 2G Cells (White List 301):

Unfortunately, having a cellular network map with 2G and 3G cells (with associated LAC and Cell-ID) would not be readily available in most networks. However, those 3G and 2G call volumes in a specific cell can be used to determine if the cell is a 2G cell or not within the 3G network. By counting the number of 2G calls made by distinct 3G subscribers which are in the 3G Users List, System 200 determines if a cell is a 2G cell and can place it into the 2G Cell White List, or simply White List. The list will have the Cell-ID, LAC and other relevant information associated with each 2G cell in the white list.

Run a counter L, for cell c (identified with a specific Cell-Id), of 2G calls made by distinct 3G users (identified in the 3G Users Database) in a specific cell over a period of time. Also, run a counter Lt for cell c of all 2G calls made over a period of time to include multiple calls made by the same user.

User 1
User 2
. . .
User Lc

Using L and Lt and comparing them against a specific threshold the system can determine if cell c is a 2G cell without a 3G coveradge, and if so, its cell-ID is placed into the White List. Closer (L/Lt) to 1, and biggest the L, the more likely the cell is a 2G cell without a 3G coveradge. However, in cells where the population of users is small many calls may be made by the same few users, in which case L/Lt may be much smaller than 1. Such scenarios must be evaluated for each specific network segments (metro or rural) being monitored.

Algorithm 1

An exemplary algorithm in the Analyzer 202, combines the outcomes of the rules with specific weights to calculate the probability of an MITM attack. Last calling and mobility records of the user may be used to calculate the probability of an attack. For example, if the user has made calls on this location before, this fact decreases the possibility of attack. If user has not made a cell change lately, then this fact increases the possibility of attack. In case the calculated probability is over a certain threshold value, Analyzer 202 will notify Detector 203. An exemplary simple algorithm that triggers an attack is as follows:

A 3G subscriber (from the 3G Users List 304) is making a 2G call in a cell (that is not in 2G White List 301). If available, check other user behavior indicators to increase the probability of attack. When the probability is high, declare user as victim.

Detector 203 will check to determine if the victim 3G subscriber is in the Critical Users Critical Users List database 305. Those users that are in the Critical Users List are special users such as VIPs, politicians, key government officials, or officers who need extra network security. This list is populated by the network operator upon request from these special users. If so, it creates a Fraud Report in Fraud Report database 405, and sends a notification request to Notifier 204, which in turn checks to determine the rules of notification from Rules database 313 for that specific notification and/or user. The Fraud Report may include detailed information about fraud time, location, subscriber info, fake BS info, etc. Notifier 204 generates a notification and sends to proper authorities via say an SMTP trap, a web services call or using other notification means. If Rules include termination of the call, Notifier 204 may also disconnect the call to that user.

Algorithm 2

The subscriber, who has a 3G profile in the HLR, is expected to attach to a 3G cell and initiate the call over the attached cell during normal 3G radio conditions and operations. In case of poor radio conditions however, mobile station triggers handover (HO) process request and starts receiving data and voice services from the corresponding 2G cell. The HO trigger due to insufficient radio conditions (poor Ec/NO or receiving power) is an expected and legitimate scenario. However, HO can also be unexpectedly triggered via a fake Base Station. System 200 can detect this condition of when there is sufficient 3G cell radio conditions while BS is enforcing mobile station to downgrade to a 2G network by monitoring the HO initiation.

An exemplary detection algorithm in Analyzer 202 corresponding to this case can be similar to ALGORITHM 1:

A 3G subscriber (from the 3G Users List 304) has a forced HO attempt is (captured in the Data Records 303) by triggering an 1-RAT Handover process in a 2G cell that is not in the White list during call setup. If available check other user behavior indicators to increase the probability of an attack. When probability is high declare user as victim.

System 202's algorithm in Analyzer 202 calculates MITM attack possibility via specific decision rules, which are listed below:

Whether the subscriber has a 3G profile in HLR or not.

By analyzing subscriber's behavior history, determine whether the subscriber is an active 3G User.

By analyzing subscriber's behavior history, determine whether the subscriber turns off 3G reception (e.g. for minimizing battery usage) or not By analyzing other subscribers in the same LAC and Cell-ID, determine whether there are other subscribers switching from 3G to 2G or not.

Detector 203 will check to determine if the victim 3G subscriber is in the Critical Users List database 305. If so, it creates a Fraud Report in Fraud Report database 405, and sends a notification request to Notifier 204, which in turn checks to determine the rules of notification from Rules database 313 for that specific notification and/or user. The Fraud Report may include detailed information about fraud time, location, subscriber info and fake BS info. Notifier 204 generates a notification and sends to proper authorities via SMS, email, or other types of messages. If Rules include termination of the call, Notifier 204 may also prompt the operator to disconnect the call to that user.

In one embodiment, the present invention provides a method to detect a fake base station in a 3G cellular network, the 3G cellular network primarily providing 3G coverage and also providing 2G coverage when the 3G coverage is unavailable, the method comprising the steps of: maintaining a database comprising data collected in real-time (e.g., call signaling data or location update data) from the 3G cellular network, said database storing a 3G subscribers list and a 2G cells white list; detecting a 3G subscriber in the 3G subscribers list in the database that is forced to make a 2G call in a 2G cell that is not in the 2G cells white list in the database; and outputting a warning identifying the 3G subscriber as a victim of man-in-the-middle attack. 3G and 2G call volumes in a specific cell within the 3G cellular network may be used to determine if the specific cell is a 2G cell providing the 2G coverage or a 3G cell providing the 3G coverage, with the determined 2G cells being placed in the 2G cells white list. In an extended embodiment, the method further comprises: maintaining for a cell c: (a) a first counter L of 2G calls made by 3G users in the 3G subscribers list in cell c over a pre-determined period of time, and (b) a second counter Lt of all 2G calls made over the pre-determined period of time to include multiple calls made by the same user; comparing a function of L and Lt (e.g., L/Lt) against a pre-determined threshold (e.g., 1) and determining if cell c is a 2G cell, and if so, placing cell c into the 2G cells white list.

In another embodiment, the present invention discloses a system to detect a fake base station in a 3G cellular network, the 3G cellular network primarily providing 3G coverage and also providing 2G coverage when the 3G coverage is unavailable, the system comprising: a database storing signaling data or location update data collected in real-time from the 3G cellular network, said database storing a 3G subscribers list and a 2G cells white list; and an analyzer call analyzing stored data and detecting a 3G subscriber in the 3G subscribers list in the database that is forced to make a 2G call in a 2G cell that is not in the 2G cells white list in the database; and outputting a notification (e.g., a SNMP trap, a web services notification or an SMS) identifying the 3G subscriber as a victim of man-in-the-middle attack. 3G and 2G call volumes in a specific cell within the 3G cellular network may be used to determine if the specific cell is a 2G cell providing the 2G coverage or a 3G cell providing the 3G coverage, with the determined 2G cells being placed in the 2G cells white list. In an extended embodiment, the method further comprises: maintaining for a cell c: (a) a first counter L of 2G calls made by 3G users in the 3G subscribers list in cell c over a pre-determined period of time, and (b) a second counter Lt of all 2G calls made over the pre-determined period of time to include multiple calls made by the same user; comparing a function of L and Lt (e.g., L/Lt) against a pre-determined threshold (e.g., 1) and determining if cell c is a 2G cell, and if so, placing cell c into the 2G cells white list. In another extended embodiment, the system further comprises a detector to determine if the attack is performed towards a user that is in a critical user list.

Figure 5:
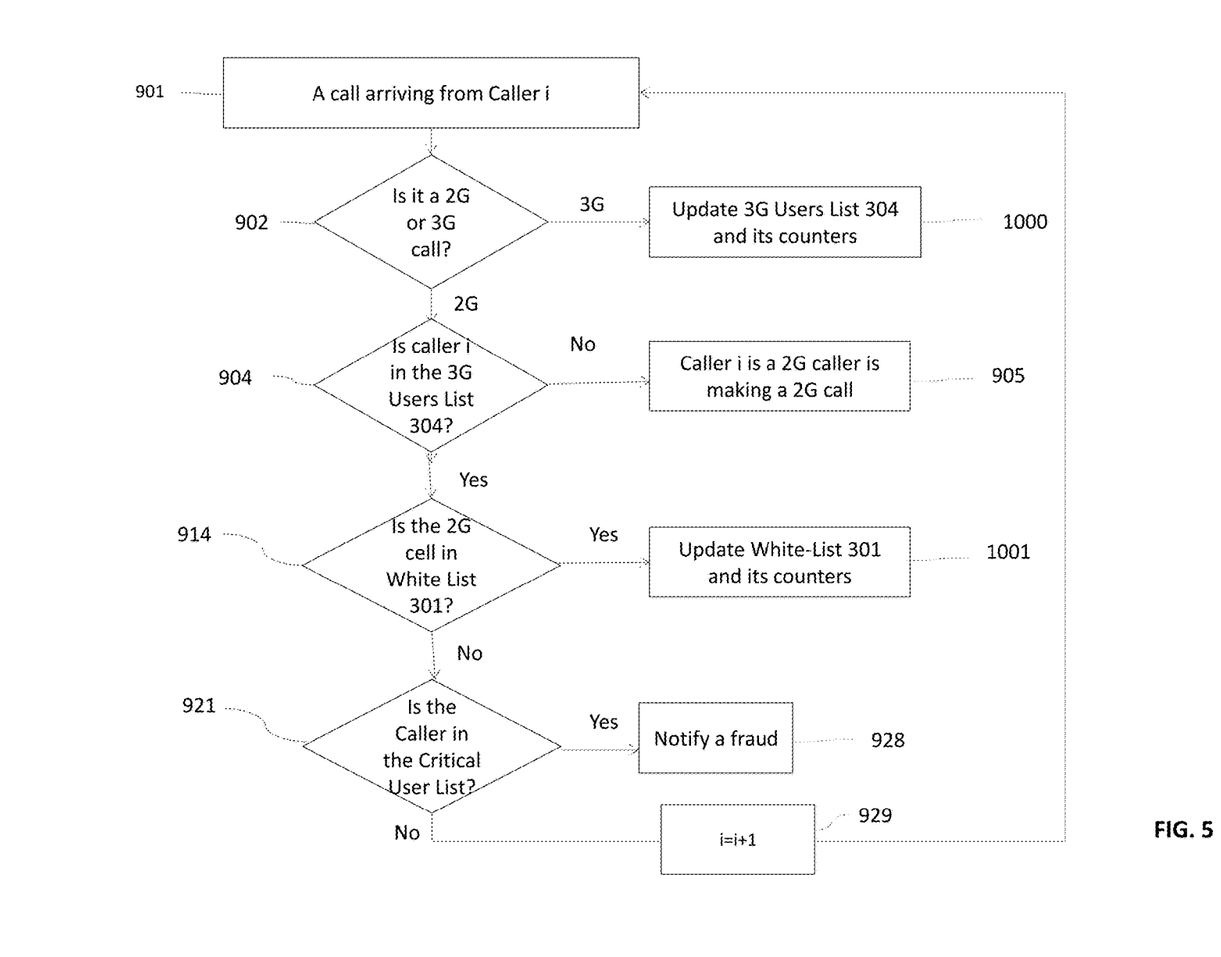
FIG. 5 depicts an exemplary flow chart of the 'detecting' method according to the invention.

A simple flow-chart showing the steps of detecting an IMSI-catcher is shown in FIG. 5. In step 901, a call from caller i arrives which results in appropriate user data record to be generated in user data records 303 by the network probe. In step 902, Analyzer 202 checks to determine if the call of caller i is a 2G or 3G call. If the call is a 3G call, it means that caller i is a 3G user, and hence, the 3G Users List 304 is updated in step 1000 by adding the user into the database if it is not already listed in said database. However, if the call is a 2G call, then the caller i is checked against the 3G Users List 304 to determine if it is a 2G call made by a known 3G user in step 904. Here we assume that lists like the 3G Users List and White list are compiled by monitoring the network for a sufficient length of time such as a few days. The method of FIG. 5 is of course applied after such lists are fully compiled. However, these lists are kept current by adding newly discovered 3G users and 2G cells by observing on going calls described in FIG. 5 in real-time. These lists may have certain counters that are updated as new calls are being made. If the user is not a 3G user, then it is a 2G user. If the user is in the 3G Users List 304, then we check to determine if the call is being made in a 2G cell on White list 301. If yes, in step 1001, the list counters are updated and the next call is processed according to step 929. If not, in step 928, the cell can be declared as a fake cell, and a fraud is notified according to the methods of the system.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

In one embodiment, the present invention provides an article of manufacture having computer readable storage medium having instructions executable by a processor to implement a method to detect a fake base station in a 3G cellular network, the 3G cellular network primarily providing 3G coverage and also providing 2G coverage when the 3G coverage is unavailable, the method implemented by a processor comprising: maintaining a database comprising data collected in real-time from the 3G cellular network, said database storing a 3G subscribers list and a 2G cells white list; detecting a 3G subscriber in the 3G subscribers list in the database that is forced to make a 2G call in a 2G cell that is not in the 2G cells white list in the database; outputting a warning identifying the 3G subscriber as a victim of a man-in-the-middle attack, and wherein 3G and 2G call volumes in a specific cell within the 3G cellular network are used to determine if the specific cell is a 2G cell providing the 2G coverage or a 3G cell providing the 3G coverage, with determined 2G cells being placed in the 2G cells white list as follows: maintaining for a cell c: (a) a first counter L of 2G calls made by 3G users in the 3G subscribers list in cell c over a pre-determined period of time, and (b) a second counter Lt of all 2G calls made over the pre-determined period of time to include multiple calls made by the same user; and comparing a function of L and Lt against a pre-determined threshold and determining if cell c is a 2G cell, and if so, placing cell c into the 2G cells white list.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

CONCLUSION

A system and method has been shown in the above embodiments for the effective implementation of a system and method for detecting a man-in-the-middle attack in real-time to a mobile terminal in a 3G cellular network using a statistical approach. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A method to detect a fake base station in a 3G cellular network, the 3G cellular network primarily providing 3G coverage and also providing 2G coverage when the 3G coverage is unavailable, the method comprising the steps of:
   maintaining a database comprising data collected in real-time from the 3G cellular network, said database storing a 3G subscribers list and a 2G cells white list;
   maintaining for a cell c: (a) a first counter L of 2G calls made by 3G users in the 3G subscribers list in cell c over a pre-determined period of time, and (b) a second counter Lt of all 2G calls made over the pre-determined period of time to include multiple calls made by the same user, and comparing a function of L and Lt against a pre-determined threshold and determining when cell c is a 2G cell and placing cell c into the 2G cells white list, wherein 3G and 2G call volumes in the cell is used to determine when the cell is a 2G cell providing the 2G coverage or a 3G cell providing the 3G coverage, with determined 2G cells being placed in the 2G cells white list;
   detecting a 3G subscriber in the 3G subscribers list in the database that is forced to make a 2G call in a 2G cell that is not in the 2G cells white list in the database; and
   outputting a warning identifying the 3G subscriber as a victim of man-in-the-middle attack.

2. The method of claim 1, wherein the function is L/Lt and the pre-determined threshold is 1.

3. The method of claim 1, wherein the data collected is based on passively monitoring Key Performance Indicators (KPIs) from an A-interface and a Iu-CS interface.

4. The method of claim 3, wherein a network probe is used in the passive monitoring.

5. The method of claim 1, wherein the data collected is call signaling data or location update data.

6. The method of claim 1, wherein the 2G cells white list stores, for each stored 2G cell, a cell-ID and a Location Area Code (LAC).

7. The method of claim 1, wherein the database is kept current by periodic or continuous updates of both the 3G subscribers list and the 2G cells white list.

8. A system to detect a fake base station in a 3G cellular network, the 3G cellular network primarily providing 3G coverage and also providing 2G coverage when the 3G coverage is unavailable, the system comprising:
- a database configured to store signaling data or location update data collected in real-time from the 3G cellular network, said database storing a 3G subscribers list and a 2G cells white list; and
- an analyzer configured to analyze stored data and detecting a 3G subscriber in the 3G subscribers list in the database that is forced to make a 2G call in a 2G cell that is not in the 2G cells white list in the database; and outputting a notification identifying the 3G subscriber as a victim of man-in-the-middle attack,
- wherein the analyzer maintains for a cell c: (a) a first counter L of 2G calls made by 3G users in the 3G subscribers list in cell c over a pre-determined period of time, and (b) a second counter Lt of all 2G calls made over the pre-determined period of time to include multiple calls made by the same user, and where the analyzer compares a function of L and Lt against a pre-determined threshold to determine when cell c is a 2G cell and placing cell c into the 2G cells white list, and
- wherein 3G and 2G call volumes in the cell is used to determine when the cell is a 2G cell providing the 2G coverage or a 3G cell providing the 3G coverage, with determined 2G cells being placed in the 2G cells white list.

9. The system of claim 8, wherein the function is L/Lt and the pre-determined threshold is 1.

10. The system of claim 8, wherein the data collected is based on passively monitoring Key Performance Indicators (KPIs) from an A-interface and a Iu-CS interface.

11. The system of claim 10, wherein a network probe is used in the passive monitoring.

12. The system of claim 8, wherein the 2G cells white list stores, for each stored 2G cell, a cell-ID and a Location Area Code (LAC).

13. The system of claim 8, wherein the database is kept current by periodic or continuous updates of both the 3G subscribers list and the 2G cells white list.

14. The system of claim 8, wherein the system further comprises a detector to determine if the attack is performed towards a user that is in a critical user list.

15. The system of claim 8, wherein the notification is any of the following: a SNMP trap, a web services notification or an SMS.

16. An article of manufacture having non-transitory computer readable storage medium having instructions executable by a processor to implement a method to detect a fake base station in a 3G cellular network, the 3G cellular network primarily providing 3G coverage and also providing 2G coverage when the 3G coverage is unavailable, the method implemented by a processor comprising:
- maintaining a database comprising data collected in real-time from the 3G cellular network, said database storing a 3G subscribers list and a 2G cells white list;
- maintaining for a cell c: (a) a first counter L of 2G calls made by 3G users in the 3G subscribers list in cell c over a pre-determined period of time, and (b) a second counter Lt of all 2G calls made over the pre-determined period of time to include multiple calls made by the same user, and comparing a function of L and Lt against a pre-determined threshold and determining when cell c is a 2G cell and placing cell c into the 2G cells white list, wherein 3G and 2G call volumes in the cell is used to determine when the cell is a 2G cell providing the 2G coverage or a 3G cell providing the 3G coverage, with determined 2G cells being placed in the 2G cells white list;
- detecting a 3G subscriber in the 3G subscribers list in the database that is forced to make a 2G call in a 2G cell that is not in the 2G cells white list in the database;
- outputting a warning identifying the 3G subscriber as a victim of man-in-the-middle attack, and
- wherein 3G and 2G call volumes in a specific cell within the 3G cellular network is used to determine when the specific cell is a 2G cell providing the 2G coverage or a 3G cell providing the 3G coverage, with determined 2G cells being placed in the 2G cells white list as follows: maintaining for a cell c: (a) a first counter L of 2G calls made by 3G users in the 3G subscribers list in cell c over a pre-determined period of time, and (b) a second counter Lt of all 2G calls made over the pre-determined period of time to include multiple calls made by the same user; and comparing a function of L and Lt against a pre-determined threshold and determining when cell c is a 2G cell, and when so, placing cell c into the 2G cells white list.

* * * * *